United States Patent
Spitz et al.

(10) Patent No.: US 9,296,102 B2
(45) Date of Patent: Mar. 29, 2016

(54) ROBOT, DEVICE AND A METHOD FOR CENTRAL PATTERN GENERATOR(CPG) BASED CONTROL OF A MOVEMENT OF THE ROBOT

(71) Applicants: Jonathan Spitz, Haifa (IL); Miriam Zacksenhouse, Haifa (IL)

(72) Inventors: Jonathan Spitz, Haifa (IL); Miriam Zacksenhouse, Haifa (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 268 days.

(21) Appl. No.: 13/734,982

(22) Filed: Jan. 6, 2013

(65) Prior Publication Data

US 2014/0031986 A1    Jan. 30, 2014

Related U.S. Application Data

(60) Provisional application No. 61/585,260, filed on Jan. 11, 2012.

(51) Int. Cl.

| | |
|---|---|
| *G05B 15/00* | (2006.01) |
| *G05B 19/00* | (2006.01) |
| *B25J 9/16* | (2006.01) |
| *B62D 57/032* | (2006.01) |
| *B62D 57/02* | (2006.01) |

(52) U.S. Cl.
CPC ........ *B25J 9/1633* (2013.01); *B25J 9/16* (2013.01); *B62D 57/02* (2013.01); *B62D 57/032* (2013.01); *Y10S 901/01* (2013.01)

(58) Field of Classification Search
USPC ............... 700/245, 261, 250, 258, 260, 246; 704/9; 318/568.12, 567, 568.1, 568.11; 600/595; 601/35, 5, 33, 16; 602/23; 128/898; 901/1, 9, 46, 47; 623/53, 27, 623/28

See application file for complete search history.

(56) References Cited

U.S. PATENT DOCUMENTS

| | | | |
|---|---|---|---|
| 8,419,804 B2* | 4/2013 | Herr et al. .................. 623/24 |
| 8,801,641 B2* | 8/2014 | Kazerooni et al. ............ 601/35 |
| 2003/0120385 A1* | 6/2003 | Etienne-Cummings .. A61F 2/72 700/245 |
| 2004/0249316 A1* | 12/2004 | Ashihara et al. ............ 600/595 |
| 2005/0055131 A1* | 3/2005 | Mikami et al. .............. 700/245 |
| 2005/0119791 A1* | 6/2005 | Nagashima .................. 700/253 |
| 2007/0016329 A1* | 1/2007 | Herr et al. .................... 700/250 |
| 2009/0055021 A1* | 2/2009 | Sano et al. ................... 700/254 |
| 2009/0299523 A1* | 12/2009 | Kim et al. .................... 700/245 |
| 2010/0113980 A1* | 5/2010 | Herr et al. .................... 600/587 |
| 2010/0280629 A1* | 11/2010 | Jung et al. ................... 623/53 |
| 2010/0324699 A1* | 12/2010 | Herr ........................ A61F 2/66 623/27 |
| 2011/0015790 A1* | 1/2011 | Yamakawa et al. .......... 700/280 |
| 2011/0068875 A1* | 3/2011 | Hotta et al. .................... 331/57 |
| 2012/0005141 A1* | 1/2012 | Sasagawa ...................... 706/25 |

* cited by examiner

*Primary Examiner* — Ronnie Mancho
(74) *Attorney, Agent, or Firm* — Reches Patents

(57) ABSTRACT

A robot, a method and a device for controlling a movement of a robot are provided. The method can include controlling multiple steps of the robot. Thus, the method can include multiple iterations of: (i) calculating or receiving a first slope attribute indicative of a slope of a first area of a terrain on which a first leg of the robot steps; (ii) feeding the first slope attribute to a central pattern generator (CPG); and (iii) generating, by the CPG and in response to the slope attribute, at least one control pulse for controlling a torque characteristic of a torque applied by at least one leg of the robot.

24 Claims, 14 Drawing Sheets

ROBOT, DEVICE AND A METHOD FOR CENTRAL PATTERN GENERATOR(CPG) BASED CONTROL OF A MOVEMENT OF THE ROBOT

BACKGROUND OF THE INVENTION

Robots are expected to propagate over different terrains. There is a growing need to provide a method for controlling a movement of a robot that is robust, can allow the robot to propagate over terrains that include positive and negative slopes, and is cost effective.

SUMMARY

According to an embodiment of the invention a method may be provided for controlling a movement of a robot. The method can include controlling multiple steps of the robot. The method can include multiple repetitions of (i) calculating or receiving a first slope attribute indicative of a slope of a first area of a terrain on which a first leg of the robot steps; (ii) feeding the first slope attribute to a central pattern generator (CPG); and (iii) generating, by the CPG and in response to the slope attribute, at least one control pulse for controlling a torque characteristic of a torque applied by at least one leg of the robot. The torque can be applied when another leg steps on another area of the terrain.

The torque can be applied at other times, can be applied on the terrain or on another portion or joint of the robot.

The method may include calculating the first slope attribute based upon an orientation of at least one element of the first leg when the first leg steps on the first area.

The method may include calculating the first slope attribute based upon an angle between two elements of the first leg when the first leg steps on the first area.

The method may include feeding the first slope attribute only once during a gait cycle that starts when the first leg steps on the first area and ends when another leg steps on another area.

The method may include changing a frequency of at least one oscillatory unit of the CPG based upon the first slope attribute.

The method may include calculating or receiving a friction attribute indicative of a friction between the first area of the terrain and the first leg of the robot; feeding the friction attribute to the CPG; and generating, by the CPG and in response to the slope attribute and the friction attribute, a control pulse that controls the torque characteristic of a torque applied by at least one leg of the robot, the torque can be applied when the other leg steps on another area of the terrain.

The method may include shortening the second leg so that the second leg can exceed the first leg, without scraping the ground.

The method may include applying, by a second leg of the robot and in response to the at least one control pulse, a torque on the second area of the terrain.

The applying may include affecting a state of a series elastic actuator.

The method may include calculating the first slope attribute based upon a timing of the stepping of the first leg on the first area.

The method may include calculating the first slope attribute based upon information supplied by an image sensor.

The method may include calculating the first slope based upon multiple slope measurements that were executed during a gait cycle that ended when the first leg stepped on the first area.

According to an embodiment of the invention a robot control device may be provided and may include: (i) at least one element out of an interface and a calculator; wherein the calculator may be arranged to calculate a first slope attribute indicative of a slope of a first area of a terrain on which a first leg of the robot steps; wherein the interface may be arranged to receive the first slope attribute; and (ii) a central pattern generator (CPG) that may be arranged to receive the first slope attribute and to generate, in response to the slope attribute, at least one control pulse for controlling a torque characteristic of a torque applied by at least one leg of the robot. The torque can be applied when another leg steps on another area of the terrain.

The calculator may be arranged to calculate the first slope attribute based upon an orientation of at least one element of the first leg when the first leg steps on the first area.

The calculator may be arranged to calculate the first slope attribute based upon an angle between two elements of the first leg when the first leg steps on the first area.

The calculator may be arranged to send to the CPG the first slope attribute only once during a gait cycle that starts when the first leg steps on the first area and ends when another leg steps on another area.

The CPG may include multiple oscillatory units. The calculator may be arranged to change a frequency of at least one oscillatory unit of the CPG based upon the first slope attribute.

The CPG may be arranged to receive a friction attribute indicative of a friction between the first area of the terrain and the first leg of the robot and to generate, in response to the slope attribute and the friction attribute, the control pulse that controls a torque characteristic of a torque applied by al least one leg of the robot conveniently when another leg steps on another area of the terrain.

The calculator may be arranged to calculate the first slope attribute based upon a timing of the step of the first leg on the first area.

The calculator may be arranged to calculate the first slope attribute based upon information supplied by an image sensor. The image sensor can be any type of image sensor, such as a laser range finder, an infrared image sensor, a camera, and the like. The image sensor can operate in the visible light spectrum, infrared, ultra violet, Millimetric waves or other wavelengths. There can be multiple sensors of different types.

The calculator may be arranged to calculate the first slope attribute based upon multiple slope measurements that were executed during a gait cycle that ended when the first leg steps on the first area.

According to an embodiment of the invention a robot may be provided and may include a robot control device as illustrated above.

The robot may include (i) a first leg; (ii) a second leg; (iii) at least one element out of (a) a calculator that may be arranged to calculate a first slope attribute indicative of a slope of a first area of a terrain on which the first leg steps; and (b) an interface that may be arranged to receive the first slope attribute; and (iv) a central pattern generator (CPG) that may be arranged to receive the first slope attribute and to generate, in response to the slope attribute, at least one control pulse for controlling a torque characteristic of a torque applied by at least one leg. The torque can be applied when another leg steps on another area of the terrain.

BRIEF DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

Figure 1:
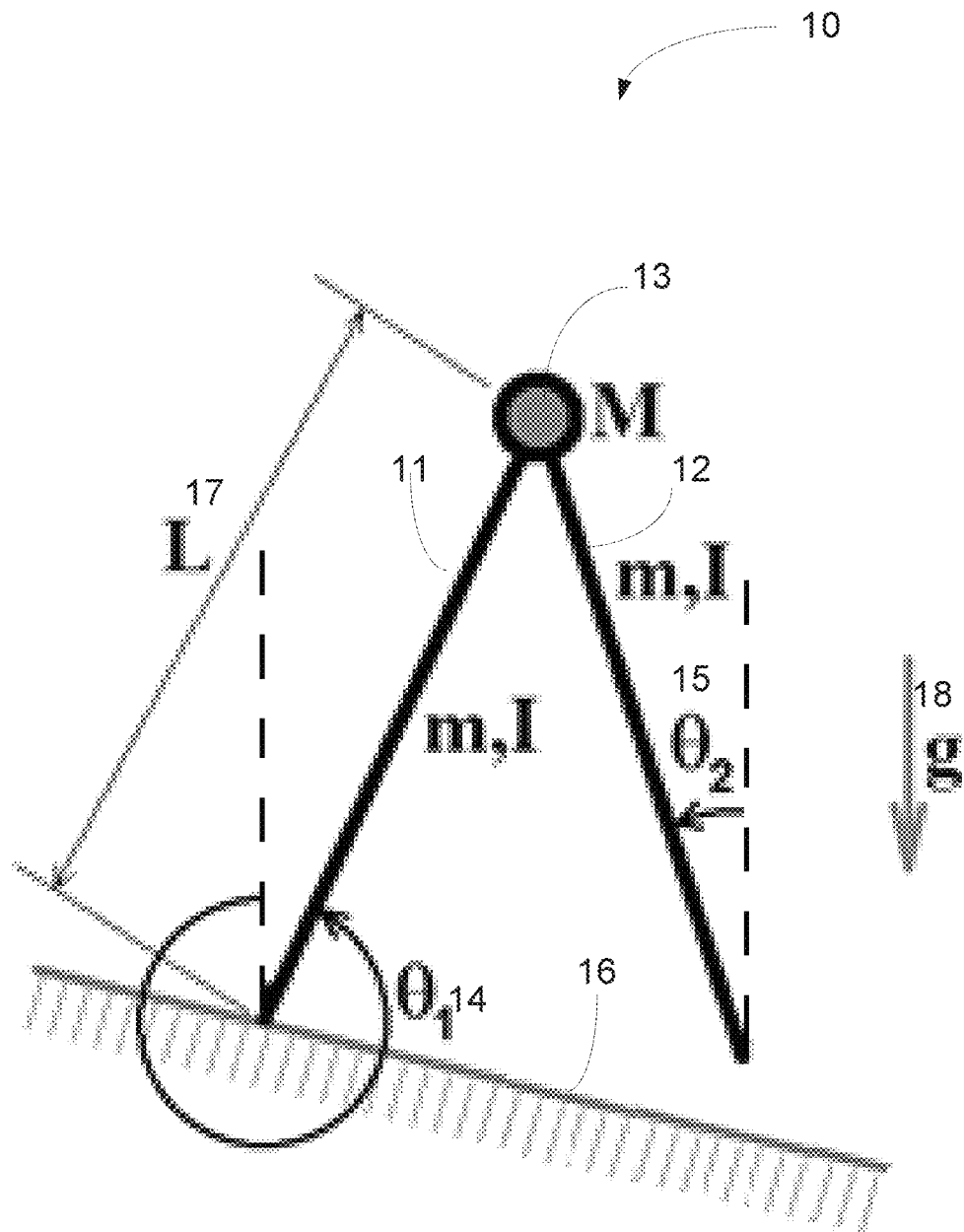
FIG. 1 illustrates a two legged robot and various physical attributes according to various embodiments of the invention.

There are provided methods, robots, robot control devices and computer readable media that provide a cost effective, accurate and robust control scheme of a movement of the robot. The control scheme can be applied on various legged robots and adapts on-line to the conditions of the terrain in proximity of the robot and can use minimal, event-driven feedback to the CPG. There may be provided a combination of the strengths of feedback and CPG control while minimizing the respective disadvantages, i.e., increasing robustness to environmental disturbances with limited sensing resources, and avoiding the pitfalls of noisy, imprecise and delayed measurements.

Some examples in the following test may refer to a robot that is a compass biped that can adapt to the slope of the terrain and climb stairs. The methods and devices can be applied mutatis mutandis to various robotic applications, and in particular for companion robots, which have to maneuver in human accessible environments. The methods and devices can be applicable to robots that have knee joints, have more than two joints per leg, have more than two legs and the like.

It is noted that the number of legs of the robot can exceed two and that legs of different configurations (from those of the mentioned below robot legs) can be provided without departing from the spirit of the invention.

For example, some of the following examples refer to a robot that has knee-Less legs but the methods and devices can be applied to robots that have knees, to robots that have a torso, to robots that do not have a torso, to robots that their legs have knee joints, ankle joints, ankle joints with both plantar-flexion and dorsi-flexion, and the like.

Yet for another example, the control schemes can be applicable to various motorized locomotives such as but not limited to assistive locomotion, including exoskeletons for walking assistance, and orthotic devices for neuro-rehabilitation of locomotion.

Feedback in the form of a slope attribute can be provided once-per-step (once per gait phase). The slope attribute can be generated by measuring the inclination of the robot when a swing leg impacts the ground. The suggested feedback can be used for controlling the movement of the robot on terrains with varying slopes.

The once-per-step feedback can greatly enhance the performance of a CPG-driven legged robots, in terms of increased robustness to disturbances and in particular to varying slopes. This extends the more common hypothesis that CPG-driven control is adequate for legged robots, and that its performance can be enhanced by feedback.

There may be provided one or more control schemes: (A) a partially integrated feedback that uses feedback (such as a first slope attribute) to change the control signals evoked by the CPG, or (B) a fully integrated feedback that uses feedback to change the control signals evoked by the CPG and the dynamics (frequency of oscillatory units, threshold) of the CPG itself.

The feedback can be measured once a step or can be fed to the CPG once per step. If the feedback is measured more than once per step then the feedback signal provided to the CPG can be an outcome of processing (for example - averaging) the different measurements.

The robot can apply torque when needed and generate minimum friction when no torque is required—so the feedback can affect the control signals evoked by the CPG at the beginning of each gait phase while allowing the leg to move almost freely and without applying any additional torque during most of the gait phase.

The CPG includes an oscillatory unit for each actuated joint and direction of rotation (either flexion or extension).

FIG. 1 illustrates a compass-biped 10 that has two knee-less legs 11 and 12, each having an ankle joint (not shown).

The legs 11 and 12 are of length L 17 and rotate about a hip joint 13 that may be connected to a torso that has a mass M. Gravity (g) is illustrated by vertical arrow 18.

The surface of the terrain is sloped. A first angle 14 can be measured between the first leg 11 and an imaginary vertical axis. A second angle 15 can be measured between the second leg 12 and an imaginary vertical line.

These first and second angles 14 and 15 can be measured by orientation sensors such as gyroscopes. Such orientation sensors (and optionally friction sensors) can be positioned at the feet of the robot or in any other location.

Figure 2A:
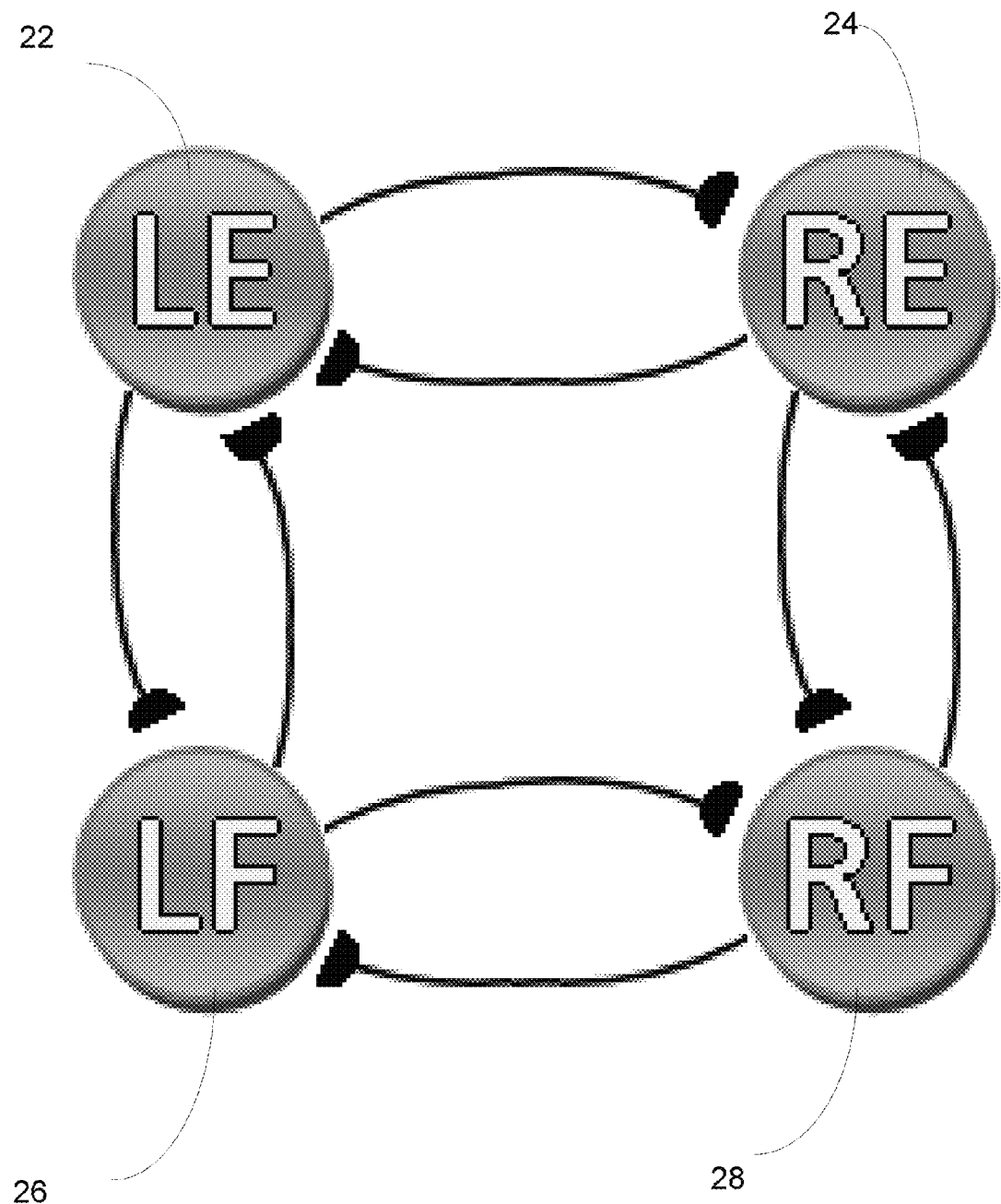
FIG. 2A illustrates a CPG according to an embodiment of the invention.

Such a compass-biped has only two actuated links. FIG. 2A illustrates the CPG 20 of the robot of FIG. 1. As there are only two knee-less legs and there are a pair of artificial muscles per leg (flexor and extensor) the CPG 20 includes four coupled oscillatory units denoted 22, 24, 26 and 28.

It should be noted that a pair of artificial muscles (flexor/extensor) can be replaced by a single bi-directional motor Each oscillatory unit controls the activation of a certain joint in a certain direction: LE—Left extensor, LF—Left flexor, RE—Right extensor, RF—Right flexor.

This CPG 20 can be extended with additional two inhibitory-coupled units for each joint, for a total of eight till fourteen units (or other number of oscillatory units) depending on the complexity of the robot. For example, additional oscillatory units associated with a knee-extensor and an ankle-extensor can be coupled only to an oscillatory unit associated with the hip-extensor of the same leg.

Each oscillatory unit of CPG 20 can be modeled as an integrate-and-fire unit, whose state (voltage) increases exponentially and is reset when reaching a predefined threshold.

Figure 2B:
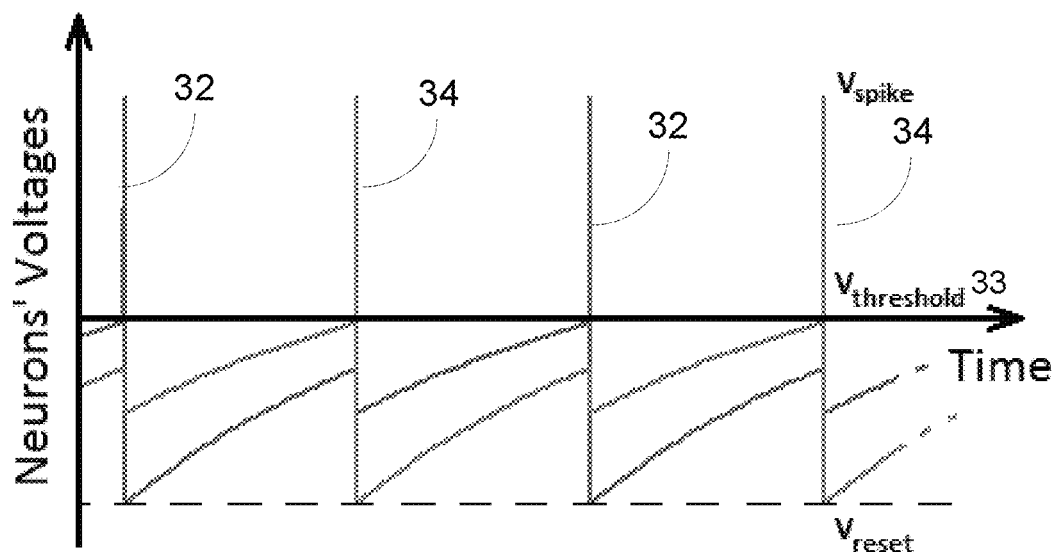
FIG. 2B includes a graph that represents the behavior of LE/RF oscillatory unit of the CPG and a graph that represents the behavior of LF/Re oscillatory unit of the CPG of FIG. 2A according to an embodiment of the invention.

FIG. 2B includes graph 32 that represents the behavior of LE and RF oscillatory units of the CPG 20. FIG. 2B also includes graph 34 that represents the behavior of LF and RE oscillatory units of the CPG 20.

Both graphs 32 and 34 show (a) an exponential increase of voltage while the voltage is below the threshold 33 and (b) a generation of a control pulse and a resetting of the voltage after reaching the threshold 33. The exponential increment has a time constant that can be changed thus changing the frequency of the crossing of the threshold.

The frequency of each oscillatory unit can be changed—by changing the rate of the exponential raise of the voltage.

Each graph of graphs 32 and 34 illustrates that a threshold crossing (of threshold 33) generates a pulse (spike), which triggers an inhibitory (decreasing) change in the state of the units it is connected to. The inhibitory coupling between the units may synchronize the extensor unit of one leg to operate in-phase with the flexor unit of the opposite leg, and out-of-phase with the other two units.

The pulses or spikes generated by the CPG 20 can be used to trigger predefined parametric control signals (torques) to activate the corresponding joints. The parameters that define the control signals are the amplitude and duration of the activations. These parameters can be based on the once-per-step feedback, as detailed in the next sub-section. The parameters can be modified from a nominal value based on the slope input using a linear function of the slope attribute. The parameters can also be modified from a nominal value based on the slope input using a non-linear function of the slope attribute.

Figure 3:
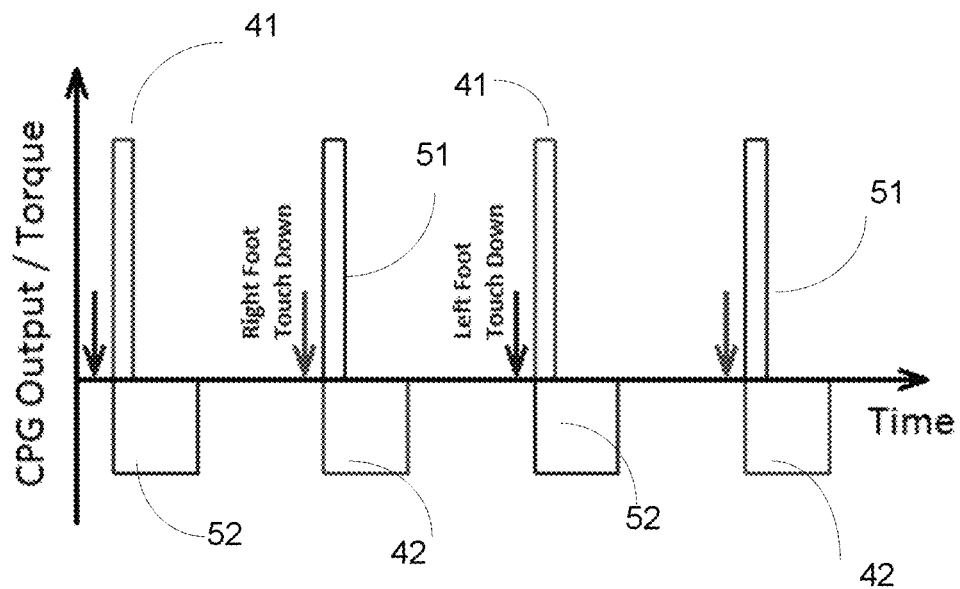
FIG. 3 illustrates the parametric control signals evoked by the CPG of FIG. 2A according to an embodiment of the invention.

FIG. 3 illustrates the parametric control signals evoked by the CPG 20 of FIG. 2A.

The flexor/extensor units reach threshold 33 shortly after foot touchdown, and activate a small but long pulse of negative torque (pulses 42 and 52) and a large but short pulse of positive torque (pulses 41 and 51), respectively. Pulses 41 and 42 refer to one leg while pulses 51 and 52 refer to another leg. The large and short pulse of positive torque is applied against the terrain.

Figure 4A:
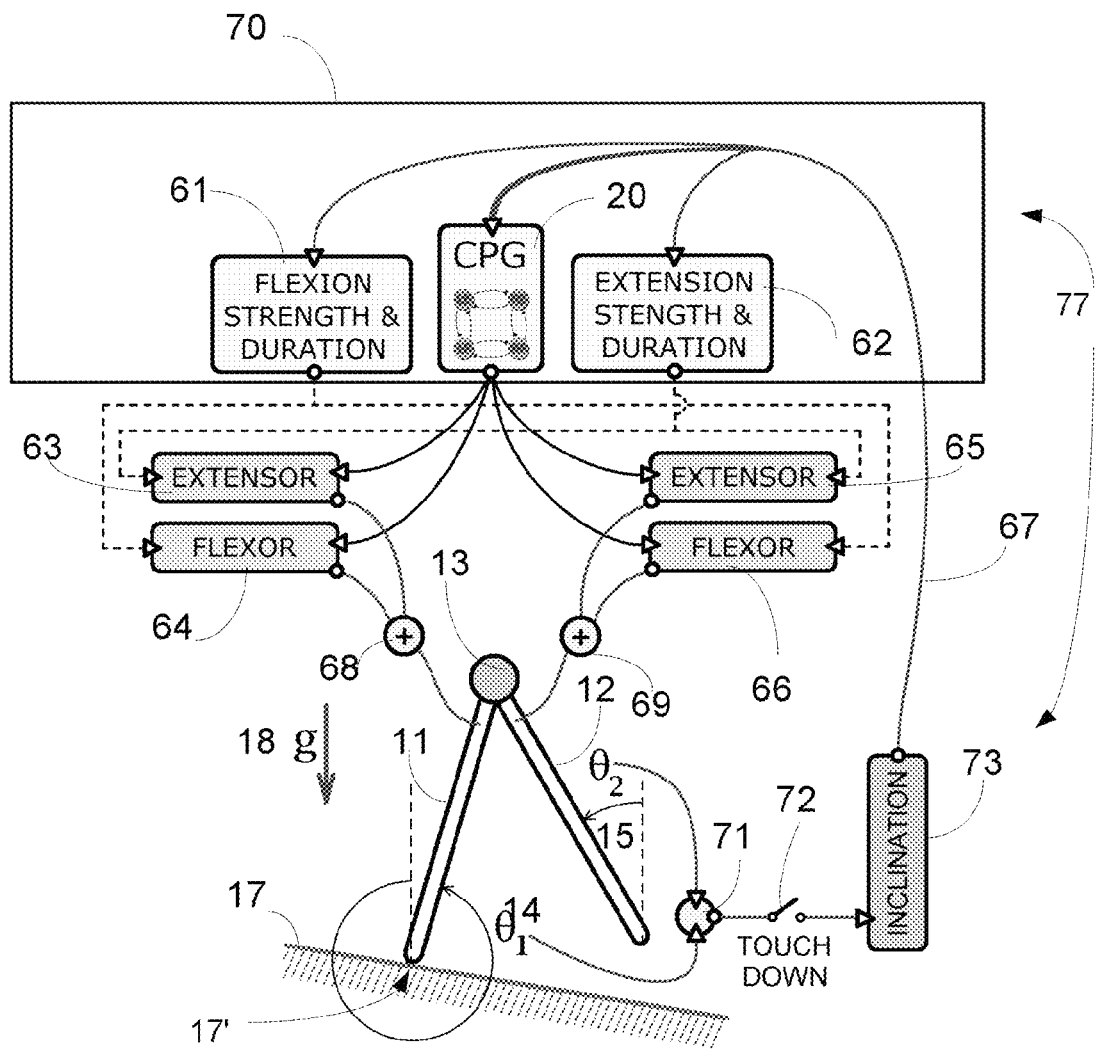
FIG. 4A illustrates a robot according to an embodiment of the invention.

FIG. 4A illustrates a robot 60 and various physical attributes according to an embodiment of the invention.

FIG. 4A illustrates the robot as including first leg 11, second leg 12, joint 13, first leg extensor 63, first leg flexor 64, second leg extensor 63, second leg flexor 64, angle sensor 71 (schematically illustrated as measuring the first and second angles 14 and 15), measurement timer (illustrated by touch down switch) 72, inclination calculator 73 and controller 70.

The controller 70 and the inclination calculator 73 may form a calculator 77.

The measurement timer 72 can feed to the inclination calculator 73 with measurements that are executed only once per step (for example- at the moment the leg contacts the terrain) but this is not necessarily so and multiple measurements can be fed to the inclination calculator 73 per gait phase. These multiple measurements can be continuous measurements, non-continuous measurements or a combination thereof.

The inclination calculator 73 can calculate, based on the first and second angles, a first slope attribute indicative of a slope of a first area of a terrain on which a first leg of the robot steps.

The inclination calculator 73 can base its calculation on various other (or alternative) parameters such as timing of robot steps, image sensor and the like.

The first area of the terrain is the contact area between first leg 11 and the terrain. The first area can include the contact area and additional areas.

When the second leg 12 contacts the terrain then that contact area can be regarded as the second area.

The controller 70 includes CPG 20 and can change zero or more control parameters, in response to the first slope attribute. Non-limiting examples of control parameters may include the CPG frequency, the duration of extension/flexion or the The strength of extension/flexion These changing of control parameters are illustrated by feedback link 67 that links between the inclination calculator 73 and each of the CPG 20, an extension pulse strength and duration module 61, and a flexion pulse strength and duration module 61. Each one of these modules (61 and 62) can determine strength and additionally or alternatively duration of flexion (module 61) and extension (module 62) based on (at least) the first slope attribute.

Thus, controller 70 can determine to modify the amplitude of at least one torque signals of FIG. 3, modify the frequency of the CPG 20, and consequentially the duration of the torque signals or a combination of both.

As indicated above, the inclination calculator 73 can use the timing of the ground-impacts as the only feedback to the controller 70.

The timing of the ground-impacts can be indicated by the phase of the CPG 20 at the time of the impact. At steady state, the phase of the CPG 20 at impact is related to the slope of the terrain. Due to transient effects, however, changes in the phase cannot be used as a direct substitute for changes in the slope. There may be provided a transfer function between slope variations and phase variations to design and evaluate a minimal feedback based only on the timing of the ground-impacts. The transfer function can be linear or non-linear. For example, the transfer function might be a non-linear function of the timing of the ground-impact that translates them into a slope value.

The robot design can be inspired by passive walkers, and its implementation may require actuators that can apply torque when needed and generate minimum friction when no torque is required. These requirements cannot be met by common geared electric motors. Instead, the robot should have a series elastic actuation system in order to provide the required torques while allowing the leg to swing freely otherwise. Alternatively, this may be achieved through common geared electric motors coupled to the legs through clutches.

The robot may require the activation of each leg separately, not only the angle between the legs. The first and second legs (swing and stance legs) of the robot can be moved by applying torques at the hip and ankle joints, respectively. The robot can have a "degenerate" foot that will provide support to apply the ankle torque.

Since the robot may have rigid legs, they need to be retracted in order to clear the ground during the swing phase. This can be provided by slightly shortening the leg upon leg extension and returning it to its normal length towards the end of the swing phase, when the angular velocity vanishes.

Lateral stability can be achieved by using a dual axis control scheme in which the slope of the terrain along two axes that are oriented to each other (for example—by 90 degrees) is measured and appropriate torques can be provided. Lateral support can be provided by adding wide feet with sideway (out-of plane) actuation at the ankles.

Figure 4B:
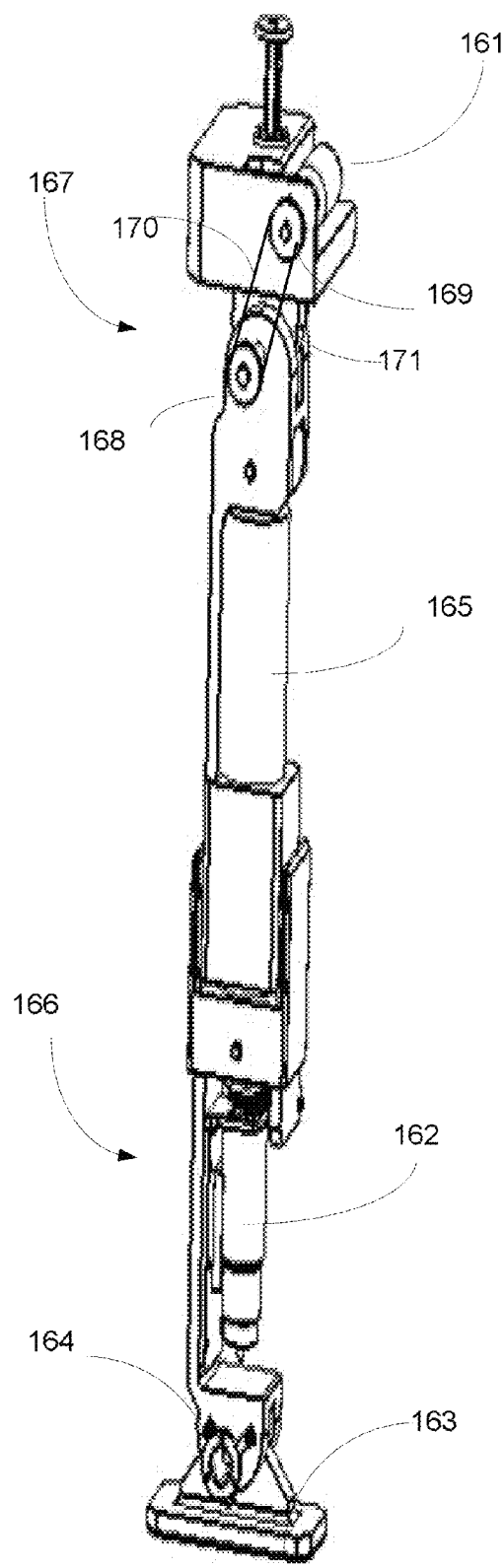
FIGS. 4B-4C illustrate a leg of a robot according to various embodiments of the invention.
Figure 4C:
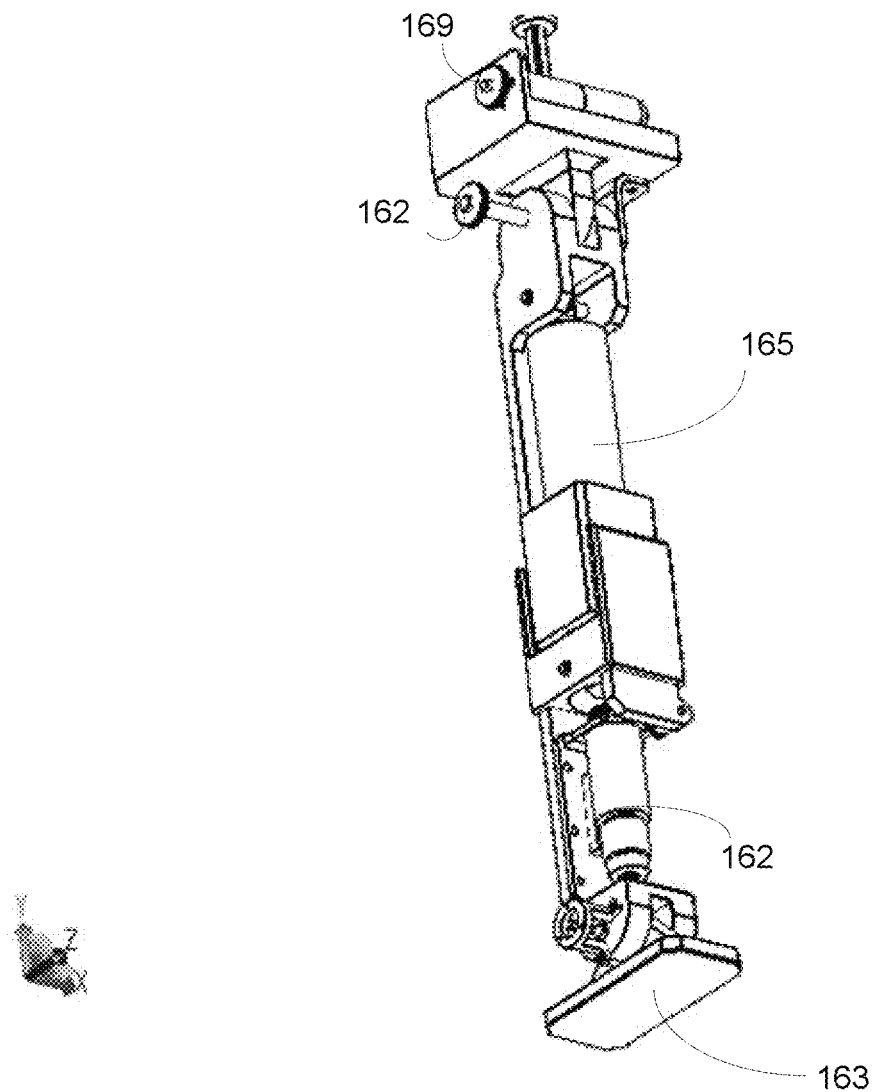

FIGS. 4B-4C illustrate a leg 160 of the robot according to an embodiment of the invention.

The robot has a hip that is connected to the upper part 166 of the leg 160 via a rotational joint 168, actuated by the hip series-elastic-actuator 161. Especially, the hip series elastic actuator 161 may rotate circular cylinder 167 that is coupled to the rotational joint 168 via elastic elements 170 and 171. The bottom part of the leg 160 is connected to the foot 163 through a rotational joint (having an ankle joint axis 164 that is rotates by elastic elements that are not shown) that is actuated by the ankle series-elastic-actuator 162. The upper 166 and lower 167 parts of the leg are connected by a linear actuator 165 which extends the leg or retracts it as needed. Each series-elastic-actuator includes a motor, a pair of encoders, at least two pulleys, a wire and springs. The series-elastic-actuators act as joint extensors/flexors.

Preliminary Results

Figure 5:
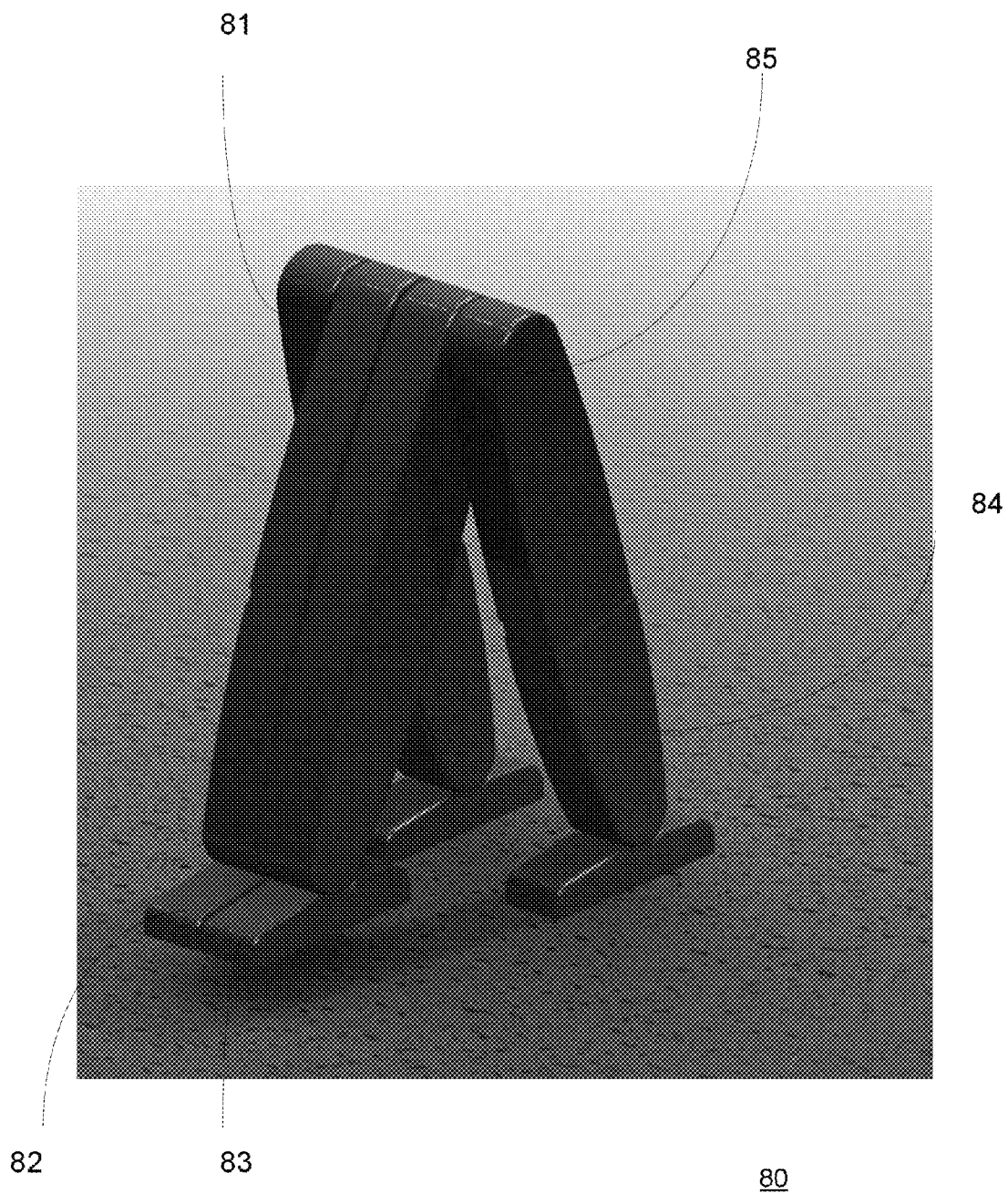
FIG. 5 illustrates a test robot according to an embodiment of the invention.

FIG. 5 illustrates a test robot 80 according to an embodiment of the invention. The test robot has four legs 81, 82, 83 and 84 instead of only a pair of legs—for providing lateral support.

Legs 81-84 are identical to each other—they are knee-less legs and are actuated at the hip and ankle joints. Each leg has an additional linear actuator to adjust its length such as to shorten the leg when the leg swings and passes over the stance leg.

Legs 82 and 83 are positioned between legs 81 and 84 and are connected to each other.

The performance and stability of the compass-biped were evaluated in three steps, using numerical simulations (performed in MATLAB).

Robustness to slope variations: the compass-biped started by walking on a flat terrain that varied gradually to an uphill/downhill sloped terrain. The final slope was increased/decreased from trial to trial to test for the range of slopes that the compass-biped can adapt to.

Steady state and bifurcation analysis: the steady state limit cycle at each slope was determined, and the initial conditions, i.e., the state immediately after leg touchdown, were extracted. Bifurcations were assessed by plotting the initial conditions as a function of the slope.

Stability analysis via Poincare map: the Poincare Map was estimated numerically by perturbing the steady state initial conditions, running the simulation for one, two or four steps (depending on the bifurcation) and calculating the eigen-values of the resulting perturbation matrixError! Reference source not found.

Figure 6A:
FIGS. 6A-6F are stick-figures that illustrate the gaits of robots over different terrains according to various embodiments of the invention.
Figure 6B:
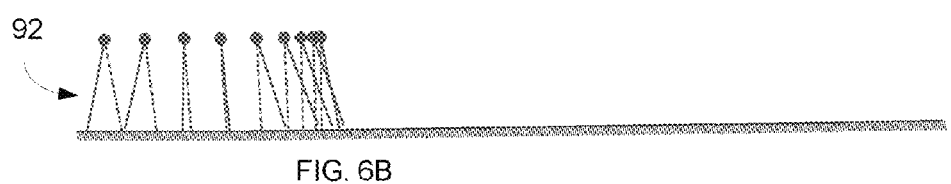
Figure 6C:
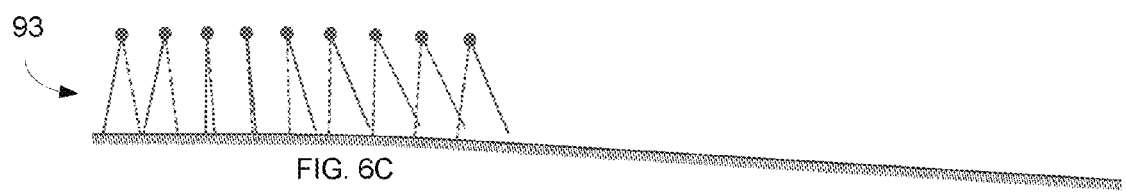
Figure 6D:
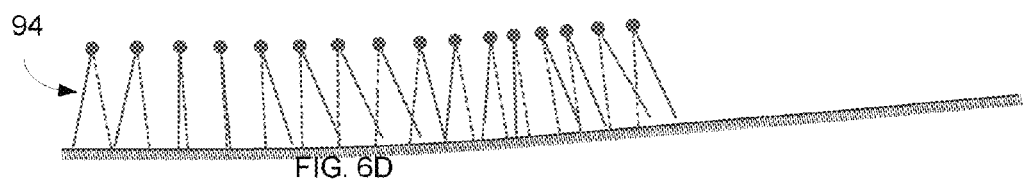
Figure 6E:
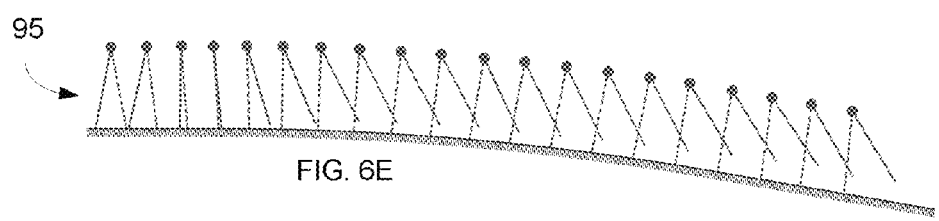
Figure 6F:
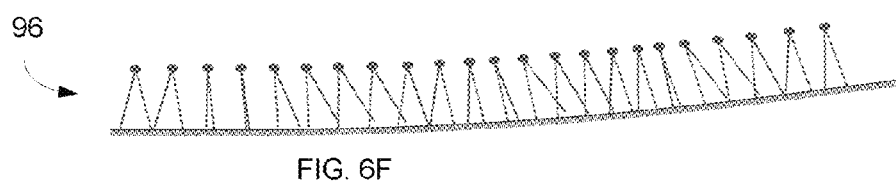

FIGS. 6A-6F are stick-figures that illustrate the gaits of robots over different terrains. The gaits were represented by the positions 91-96 of the first and second legs of the robot during different steps. FIGS. 6A and 6B illustrate the performance of the stand-alone CPG controller. FIGS. 6C and 6D illustrate the performance of the partially integrated once-per-step feedback. FIGS. 6E and 6F illustrate the performance of the fully integrated once-per-step feedback.

Stand-alone CPG control scheme allows the robot to overcome a terrain slope of −0.9/+0.7 degrees (FIGS. 6A and 6B respectively). Partially integrated once-per-step feedback allows the robot to overcome a terrain slope of −4.5/+5.5 degrees (FIGS. 6C and 6D respectively). Fully integrated once-per-step feedback allows the robot to overcome a terrain slope of −10/+10 degrees (FIGS. 6E and 6F respectively).

Figure 7:
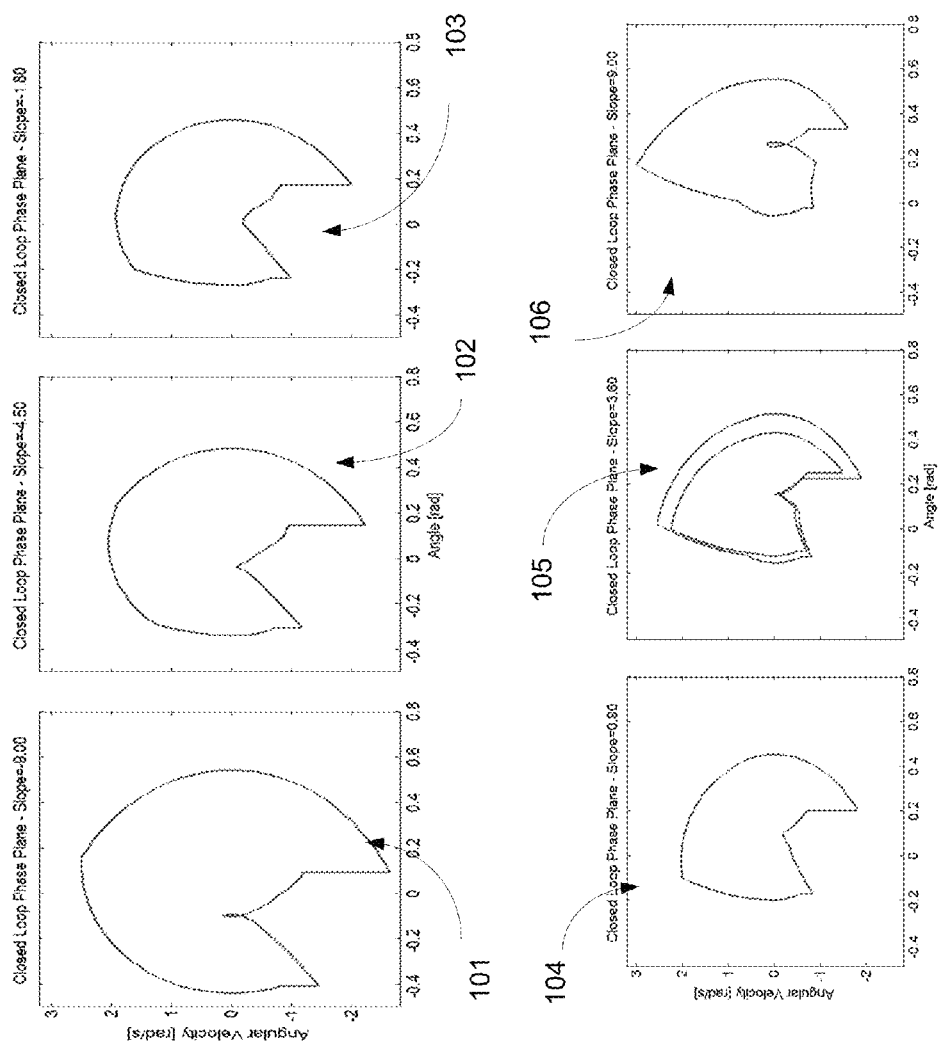
FIG. 7 illustrates limit cycles of a compass-biped robot walking on different slopes, using a CPG controller enhanced with fully integrated once-per-step feedback according to an embodiment of the invention.
Figure 8:
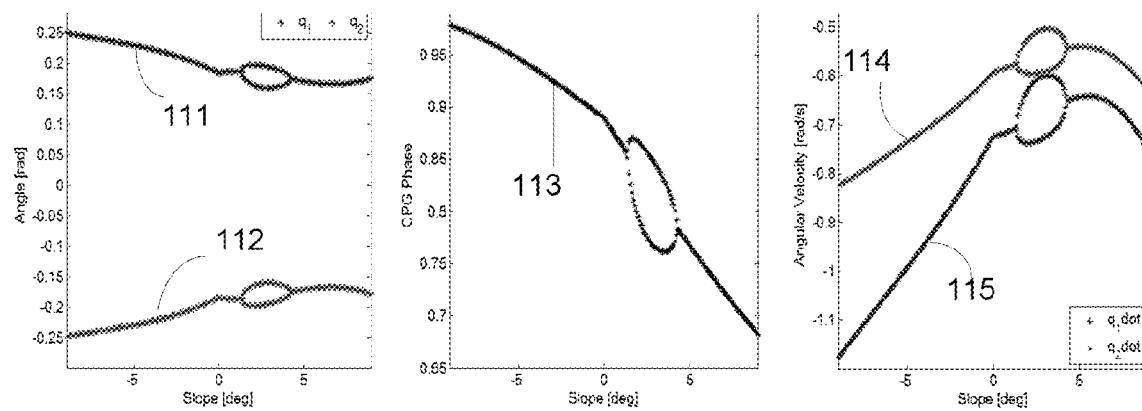
FIG. 8 illustrates a bifurcation analysis for the compass-biped robot controlled using a CPG controller enhanced with fully integrated once-per-step feedback according to an embodiment of the invention.

FIG. 7 illustrates limit cycles 101-106 of the compass-biped robot walking on different slopes, using a CPG controller enhanced with fully integrated once-per-step feedback. The limit cycles are obtained for surfaces with constant slope of (left to right, top to bottom): −9.00, −4.50, −1.80, +0.90, +3.60, +9.00 degrees. Period doubling occurs when walking on the surface with a slope of +3.60 degrees. The limit cycles illustrate the motion of the stance and swing legs throughout one step when the robot walks on a given slope FIG. 8 illustrates a bifurcation analysis for the compass-biped robot controlled using a CPG controller enhanced with fully integrated once-per-step feedback: Steady state initial conditions for the angles of the compass-biped 111, 112, CPG phase 113 and angular velocities 114, 115, as a function of the slope.

Figure 9:
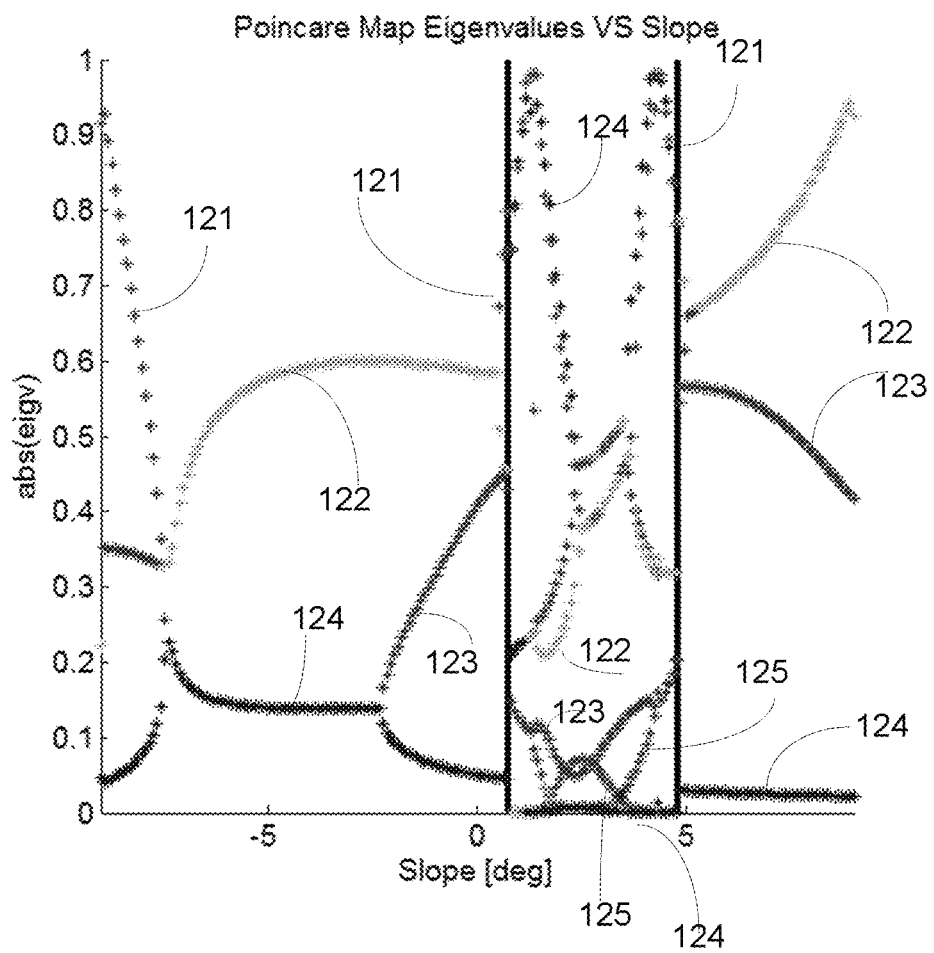
FIG. 9 is a stability analysis for the compass-biped robot controlled using a CPG controller enhanced with fully integrated once-per-step feedback according to an embodiment of the invention.

FIG. 9 is a stability analysis for the compass-biped robot controlled using a CPG controller enhanced with fully integrated once-per-step feedback: Absolute value of the eigenvalues derived from the numerical Poincare map, as a function of slope. The vertical black lines represent bifurcations. As the slope increases a period doubling bifurcation occurs—and the Poincare map was computed for two-steps. For even larger slopes, the system returns to single period dynamics.

The effect of the slope on the limit cycle depends on the control scheme. The effect on the limit cycle generated using the fully integrated FB control is shown in FIGS. 7 and 8. These figures indicate that as the uphill slope is initially increased, a period doubling bifurcation occurs, but the system returns to a single-period orbit as the slope is increased further.

The stability of the single-step and double-step cycles is demonstrated in FIG. 9, which depicts the eigen-values of the numerical Poincare maps as a function of the slope. Additional investigations are currently conducted to characterize the bifurcations, optimize performance and evaluate the sensitivity to the parameters.

Figure 10:
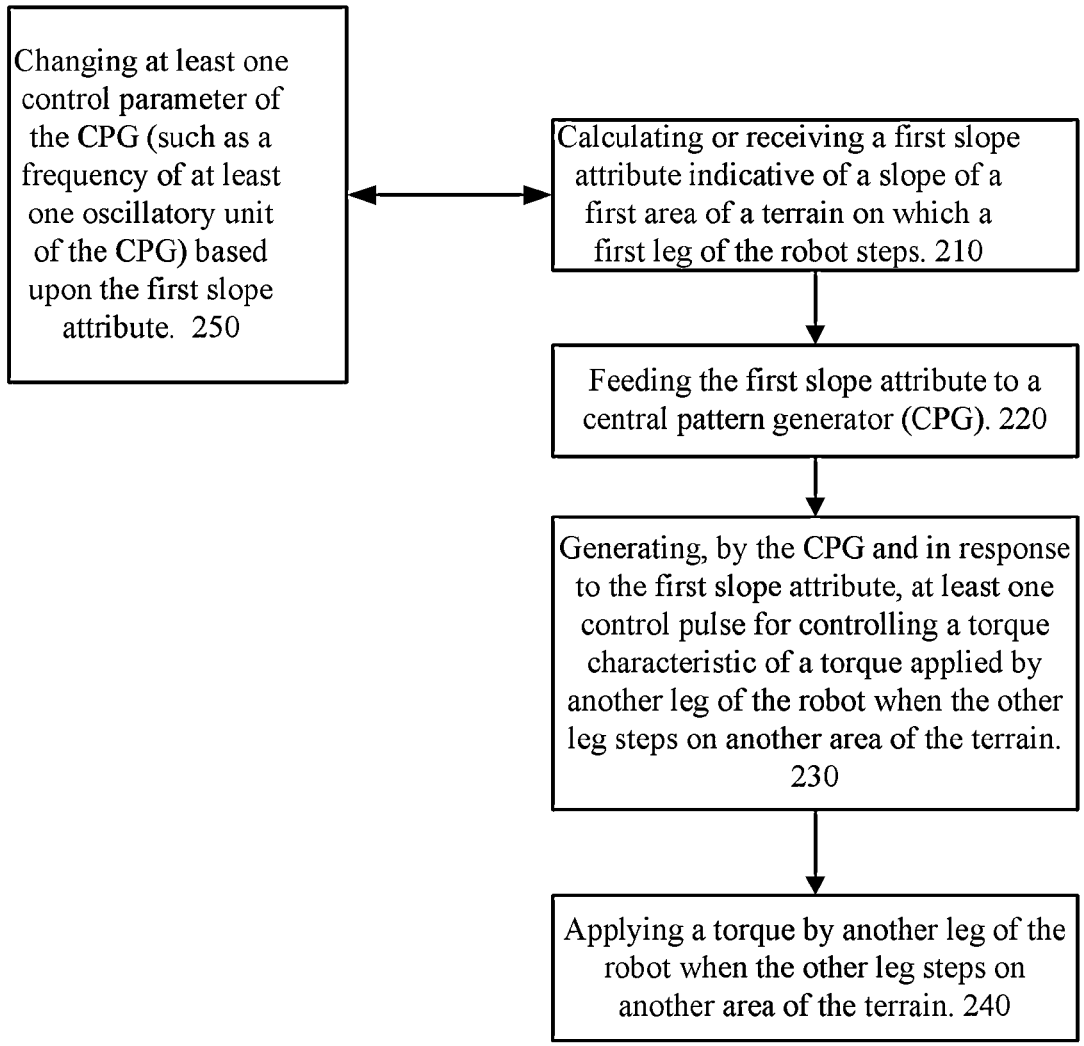
FIG. 10 illustrates a method for controlling a movement of robot according to an embodiment of the invention.

FIG. 10 illustrates method 200 for controlling a movement of robot according to an embodiment of the invention.

Method 200 includes multiple repetitions of stages 210, 220, 225, 230 and 240.

Stage 210 may include calculating or receiving a first slope attribute indicative of a slope of a first area of a terrain on which a first leg of the robot steps.

Stage 220 may include feeding the first slope attribute to a central pattern generator (CPG).

Stage 210 may include calculating the first slope attribute based upon an orientation of at least one element of the first leg when the first leg steps on the first area.

Stage 210 may include calculating the first slope attribute based upon an angle between two elements of the first leg when the first leg steps on the first area.

Stage 210 may include calculating the first slope attribute based upon a timing of the step of the first leg on the first area.

Stage 210 may include calculating the first slope attribute based upon information supplied by an image sensor.

Stage 210 may include calculating the first slope based upon multiple slope measurements that were executed during a gait cycle that ended when the first leg stepped on the first area.

Stage 220 may include feeding the first slope attribute only once during a gait cycle that starts when the first leg steps on the first area and ends when the first leg steps on another area.

Stage 220 can be followed by stage 225 of changing at least one control parameter of the CPG (such as a frequency of at least one oscillatory unit of the CPG) based upon the first slope attribute. This changed frequency can affect the gait during the current gait phase and one or more next gait phases.

Stage 230 may include generating, by the CPG and in response to the first slope attribute, at least one control pulse for controlling a torque characteristic of a torque applied by at least one other leg of the robot when the other leg steps on another area of the terrain. The other leg can be a second leg of the robot.

Stage 240 may include applying a torque by at least one leg (for example—the other leg) of the robot when the other leg steps on another area of the terrain. Stage 240 may include affecting a state of a series elastic actuator.

After another leg contacts the terrain the roles of the first and other legs are reversed (stance leg becomes swing leg ad swing leg becomes stance leg) and stages 210-240 can be repeated while the functionalities of the first and second legs are reversed.

Figure 11:
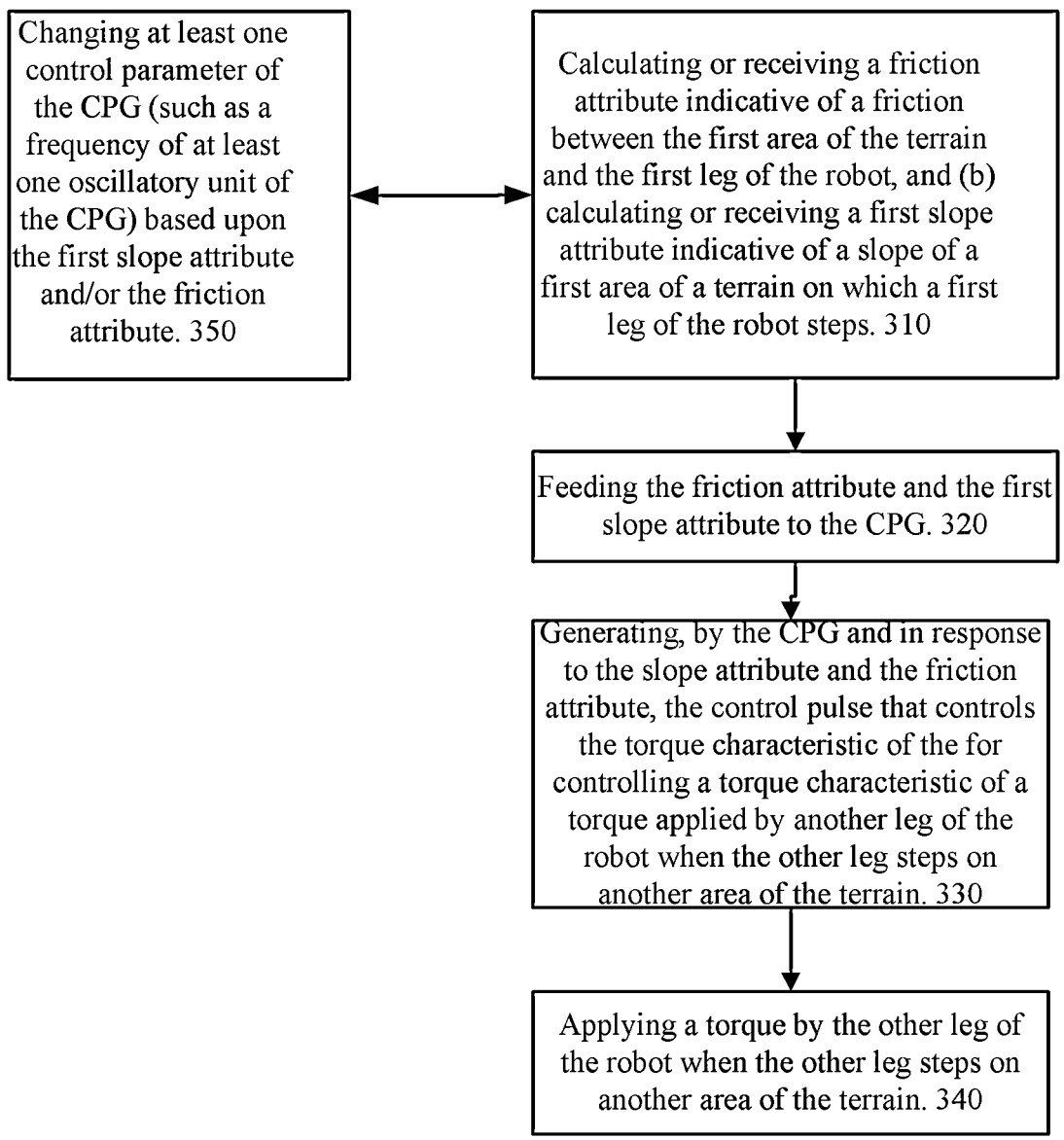
FIG. 11 illustrates a method for controlling a movement of robot according to an embodiment of the invention.

FIG. 11 illustrates method 300 for controlling a movement of robot according to an embodiment of the invention.

Method 300 includes multiple repetitions of stages 310, 320, 325, 330 and 340.

Stage 310 may include (a) calculating or receiving a friction attribute indicative of a friction between the first area of the terrain and the first leg of the robot, or (b) calculating or receiving a first slope attribute indicative of a slope of a first area of a terrain on which a first leg of the robot steps.

Stage 310 may include calculating the first slope attribute based upon an orientation of at least one element of the first leg when the first leg steps on the first area.

Stage 310 may include calculating the first slope attribute based upon an angle between two elements of the first leg when the first leg steps on the first area.

Stage 310 may include calculating the first slope attribute based upon a timing of the step of the first leg on the first area.

Stage 310 may include calculating the first slope attribute based upon information supplied by an image sensor.

Stage 310 may include calculating the first slope based upon multiple slope measurements that were executed during a gait cycle that ends when the first leg steps on the first area.

Stage 320 may include feeding the first slope attribute only once during a gait cycle that starts when the first leg steps on the first area and ends when the first leg steps on another area.

Stage 320 may include feeding the friction attribute and the first slope attribute to the CPG.

Stage 320 may be followed by stage 325 of changing at least one control parameter of the CPG (such as a frequency of at least one oscillatory unit of the CPG) based upon the first slope attribute and/or the friction attribute. This changed frequency can affect the current gait phase of future gait phases.

Stage 330 may include generating, by the CPG and in response to the slope attribute and the friction attribute, the control pulse that controls the torque characteristic of the torque applied by at least one other leg of the robot conveniently when the other leg steps on another area of the terrain.

Stage 340 may include applying a torque by the at least one other leg of the robot. The torque can be applied when the other leg steps on another area of the terrain, after or before the other leg steps on the other area.

Stage 340 may include affecting a state of a series elastic actuator.

After the second leg contacts the terrain the roles of the first and second legs are reversed (stance leg becomes swing leg ad swing leg becomes stance leg) and stages 310-340 can be repeated while the functionalities of the first and second legs are reversed.

According to an embodiment of the invention a robot control device can be provided. The robot control device can include at least one element out of an interface and a calculator; wherein the calculator may be arranged to calculate a first slope attribute indicative of a slope of a first area of a terrain on which a first leg of the robot steps; wherein the interface may be arranged to receive the first slope attribute; and a central pattern generator (CPG) that may be arranged to receive the first slope attribute and to generate, in response to the slope attribute, at least one control pulse for controlling a torque characteristic of a torque applied by at least one leg of the robot when the second leg steps on a second area of the terrain. Referring, for example, to FIG. 4, the robot control device can include CPG 20, a calculator such as inclination calculator 73 and, additionally or alternatively an interface (such as feedback line 67).

Various stages of any of the above methods can be executed by a computer that executes instructions stored in a non-transitory computer readable medium.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for controlling a movement of robot, the method comprises repeating the stages of: calculating or receiving a first slope attribute indicative of a slope of a first area of a terrain on which a first leg of the robot steps;
wherein calculating the first slope attribute based upon information supplied by an image sensor; feeding the first slope attribute to a central pattern generator (CPG); generating, by the CPG and in response to the slope attribute, at least one control pulse for controlling a torque characteristic of a torque applied by at least one leg of the robot.

2. The method according to claim 1, comprising generating the at least one control pulse for controlling a torque characteristic of a torque applied by a second leg of the robot when the second leg of the robot steps on a second area of the terrain.

3. The method according to claim 1, comprising calculating the first slope attribute based upon an orientation of at least one element of the first leg when the first leg steps on the first area.

4. The method according to claim 1, comprising calculating the first slope attribute based upon an angle between two elements of the first leg when the first leg steps on the first area.

5. The method according to claim 1, comprising feeding the first slope attribute only once during a gait cycle that starts when the first leg steps on the first area and ends when another leg steps on another area.

6. The method according to claim 1, comprising changing a frequency of at least one oscillatory unit of the CPG based upon the first slope attribute.

7. The method according to claim 1, comprising: calculating or receiving a friction attribute indicative of a friction between the first area of the terrain and the first leg of the robot; feeding the friction attribute to the CPG; and generating, by the CPG and in response to the slope attribute and to the friction attribute, the control pulse that controls the torque characteristic of the torque applied by at least one leg of the robot.

8. The method according to claim 1, comprising applying, by a second leg of the robot and in response to the at least one control pulse, torque on the second area of the terrain.

9. The method according to claim 8, wherein the applying comprises affecting a state of a series elastic actuator.

10. The method according to claim 1, comprising calculating the first slope attribute based upon a timing of a stepping of the first leg on the first area.

11. The method according to claim 1, comprising calculating the first slope based upon multiple slope measurements that were executed during a gait cycle that ended when the first leg stepped on the first area.

12. A robot control device, comprising: at least one element out of an interface and a calculator; wherein the calculator is arranged to calculate a first slope attribute based upon information supplied by an image sensor; wherein the first slope attribute indicative of a slope of a first area of a terrain on which a first leg of the robot steps; wherein the interface is arranged to receive the first slope attribute; and a central pattern generator (CPG) that is arranged to receive the first slope attribute and to generate, in response to the slope attribute, at least one control pulse for controlling a torque characteristic of a torque applied by at least one leg of the robot.

13. The device according to claim 12, wherein the CPG is arranged to generate at least one control pulse for controlling a torque characteristic of a torque applied by a second leg of the robot when the second leg of the robot steps on a second area of the terrain.

14. The device according to claim 12, wherein the calculator is arranged to calculate the first slope attribute based upon an orientation of at least one element of the first leg when the first leg steps on the first area.

15. The device according to claim 12, wherein the calculator is arranged to calculate the first slope attribute based upon an angle between two elements of the first leg when the first leg steps on the first area.

16. The device according to claim 12, wherein the calculator is arranged to send to the CPG the first slope attribute only once during a gait cycle that starts when the first leg steps on the first area and ends when another leg steps on another area.

17. The device according to claim 12, wherein the CPG comprises multiple oscillatory units; wherein the calculator is arranged to change a frequency of at least one oscillatory unit of the CPG based upon the first slope attribute.

18. The device according to claim 12, wherein the CPG is arranged to receive a friction attribute indicative of a friction between the first area of the terrain and the first leg of the robot and to generate, in response to the slope attribute and to the friction attribute, a control pulse that controls the torque characteristic of a torque applied by at least one leg of the robot.

19. The device according to claim 12, wherein the calculator is arranged to calculate the first slope attribute based upon a timing of the stepping of the first leg on the first area.

20. The device according to claim 12, wherein the calculator is arranged to calculate the first slope attribute based upon multiple slope measurements that were executed during a gait cycle that ended when the first leg stepped on the first area.

21. A robot, comprising: a first leg; a second leg; at least one element out of an interface and a calculator; wherein the calculator is arranged to calculate a first slope attribute indicative of a slope of a first area of a terrain on which the first leg steps;
wherein the interface is arranged to receive the first slope attribute; and a central pattern generator (CPG) that is arranged to receive the first slope attribute and to generate, in response to the slope attribute, at least one control pulse for controlling a torque characteristic of a torque applied by at least one leg of the first and second legs.

22. The method according to claim 1 wherein the CPG comprises multiple oscillatory units, wherein each oscillatory unit controls an activation of a certain joint of the robot in a certain direction.

23. The robot control device according to claim 12 wherein the CPG comprises multiple oscillatory units, wherein each oscillatory unit controls an activation of a certain joint of the robot in a certain direction.

24. The robot according to claim 21 wherein the CPG comprises multiple oscillatory units, wherein each oscillatory unit controls an activation of a certain joint of the robot in a certain direction.

* * * * *